United States Patent
Lim et al.

(10) Patent No.: US 7,280,512 B2
(45) Date of Patent: Oct. 9, 2007

(54) METHOD OF ALLOCATING A CHANNELISATION CODE TO ONE OF A PLURALITY OF USER TERMINALS, A CODE DIVISION MULTIPLE ACCESS TELECOMMUNICATIONS NETWORK, AND A CDMA TELECOMMUNICATIONS BASE STATION

(75) Inventors: Seau Sian Lim, Swindon (GB); Mazlyn Mona Mustapha, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 1074 days.

(21) Appl. No.: 10/262,410

(22) Filed: Sep. 30, 2002

(65) Prior Publication Data

US 2003/0081575 A1    May 1, 2003

(51) Int. Cl.
    *H04B 7/216* (2006.01)
(52) U.S. Cl. ........................ 370/335; 370/342; 370/412
(58) Field of Classification Search ...................... None
    See application file for complete search history.

(56) References Cited

U.S. PATENT DOCUMENTS

| 6,081,536 A | 6/2000 | Gorsuch | 370/468 |
| 6,813,255 B1* | 11/2004 | Goderis et al. | 370/335 |
| 6,885,691 B1* | 4/2005 | Lyu | 375/130 |
| 2002/0009068 A1 | 1/2002 | Proctor, Jr. | 370/342 |
| 2002/0018457 A1* | 2/2002 | Choi et al. | 370/342 |
| 2002/0064211 A1* | 5/2002 | Chen et al. | 375/149 |

FOREIGN PATENT DOCUMENTS

| EP | 1 150 456 A1 | 10/2001 |
| WO | WO99/45669 | 9/1999 |
| WO | WO 00/05829 | 2/2000 |
| WO | WO 01/30105 A1 | 4/2001 |

* cited by examiner

*Primary Examiner*—Duc Ho

(57) ABSTRACT

A method of allocating a channelisation code to one of a plurality of user terminals for decoding of signals sent according to a code division multiple access scheme is provided. The plurality of user terminals being reserved the code for possible use. The method comprising selecting according to a predetermined rule the user terminal to which the code is to be allocated, and allocating the code to the selected user terminal, in which the plurality of user terminals having the code for possible use constitute a group, and there are multiple groups of terminals each having an associated unique code, a record is kept of which user terminals are in which group, and the user terminal to which the code is to be allocated is selected following inspection of the record to determine which user terminals are in the group associated with the code.

12 Claims, 4 Drawing Sheets

OVSR CODE TREE

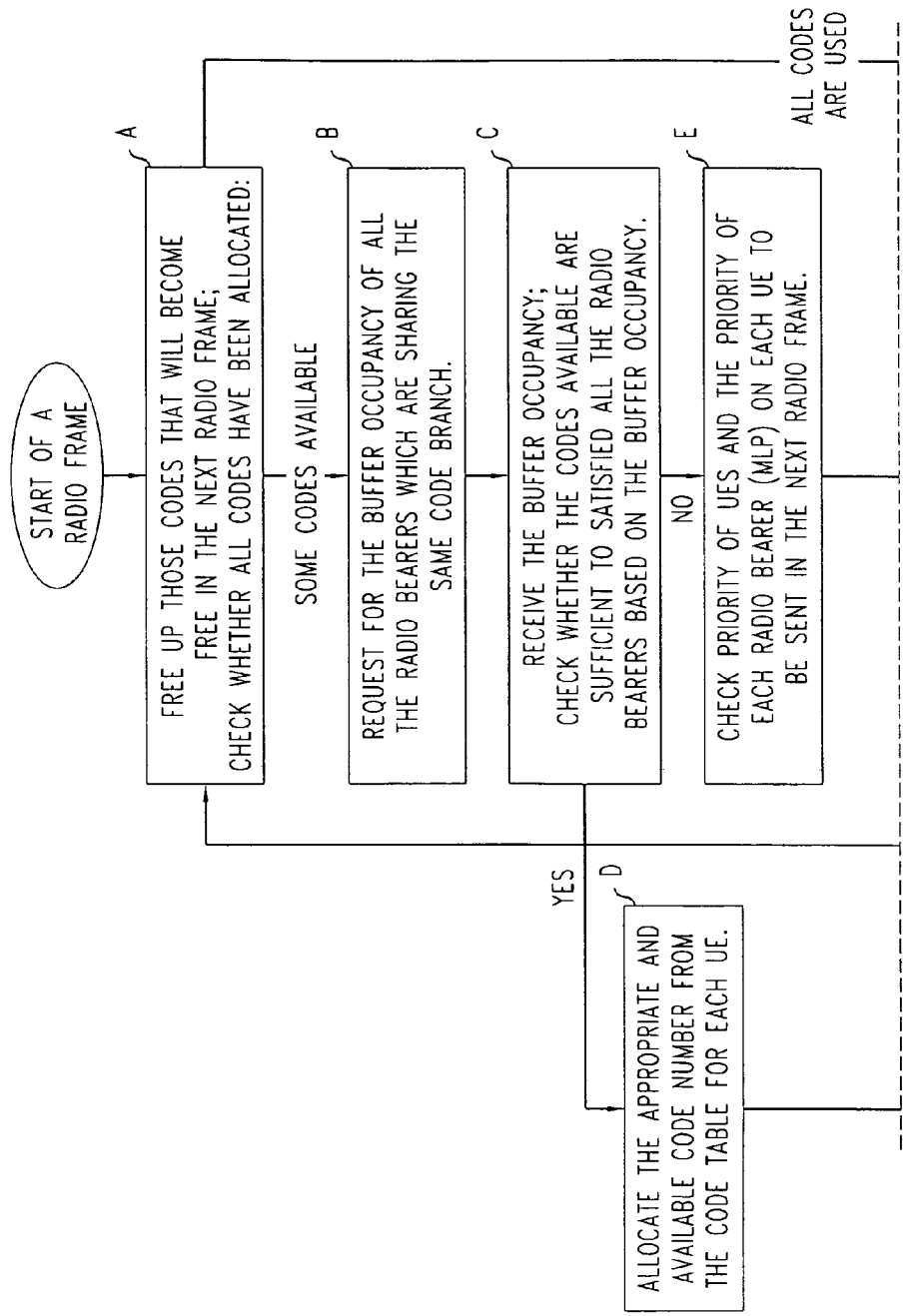

METHOD OF ALLOCATING A CHANNELISATION CODE TO ONE OF A PLURALITY OF USER TERMINALS, A CODE DIVISION MULTIPLE ACCESS TELECOMMUNICATIONS NETWORK, AND A CDMA TELECOMMUNICATIONS BASE STATION

CROSS REFERENCE TO RELATED APPLICATION

This application claims priority of Great Britain Application No. 0126121.3 filed on Oct. 31, 2001.

TECHNICAL FIELD

The present invention relates to a method of allocating a channelisation code to one of a plurality of user terminals for decoding of signals sent according to a code division multiple access scheme. The present invention also relates to a code division multiple access CDMA telecommunications network, and a code division multiple access CDMA telecommunications base station.

BACKGROUND OF THE INVENTION

One of the main but limited radio resources in networks for mobile telecommunications of code division multiple access in particular of wideband W-CDMA type, is channelisation code. The problem of how different channelisation codes are allocated to different call-connections is dealt with using a channelisation code allocation strategy. The objective of the channelisation code allocation strategy is to enable transmissions to as many users as possible with minimum complexity, as that is the most efficient way to utilise the codes.

The channelisation codes to be used in W-CDMA are orthogonal variable spreading factor OVSF codes. By using orthogonal variable spreading factor OVSF codes, variable data rates can be supported.

The orthogonal variable spreading factor OVSF codes are presented as a code tree diagram in FIG. 2. Each layer of the tree has a different spreading factor SF and for each spreading factor SF value, there is an equal number of possible codes, i.e. if spreading factor SF=8, there are 8 codes available for that spreading factor SF. Each code in the code tree is denoted in the form $C_{SF,k}$, where k is the code number.

From the orthogonal variable spreading factor OVSF code tree diagram (FIG. 2), it will be seen that codes on different layers of the tree have different lengths. During spreading, each information bit is represented by an entire codeword, so, in the known approaches, longer codes (high spreading factor SF) are used for transmissions to lower bit rate users. It follows that a high-rate user is allocated a low-spreading factor SF code, and a low-rate user is allocated a high-spreading factor SF code. This known code allocation strategy thus focuses on allocation of channelisation codes dependent upon expected data rates. This allows for fairness to all the subscribers or radio bearers associated with a subscriber. However, this is not always desirable for example where subscribers are viewed differently by operator depending on the tariff they subscribed to. In addition, some radio bearers associated with a user terminal UE are much more sensitive to delay than the others.

On a related matter, referring back to FIG. 2, a parent code is a code that generates higher spreading factor SF codes in the next layer of the code tree. For example, code $C_{2,0}$ is the parent code of codes $C_{4,0}$ and $C_{8,0}$. A child code has a higher spreading factor SF code compared with its parent code, i.e. code $C_{8,0}$ is the child code of codes $C_{4,0}$ and $C_{2,0}$. The codes contained in each layer of the code tree are mutually orthogonal. In addition, any two codes from different layers of the code tree are also orthogonal, except when one code is the parent or child of the other code. Therefore, in order to preserve orthogonality, the use of the orthogonal variable spreading factor OVSF codes has two restrictions:

1) If a code e.g. $C_{8,0}$ is in use, this means that its parent codes, e.g. $C_{4,0}$ and $C_{2,0}$, cannot be used.

2) Likewise, if a code e.g. $C_{2,0}$ is in use, the child codes, e.g. $C_{4,0}$, $C_{4,1}$, $C_{8,0}$, $C_{8,1}$, $C_{8,2}$, and $C_{8,3}$, cannot be used. This gives rise to a problem of only a limited number of codes being available. Particularly in W-CDMA, code shortage is quite severe in the downlink channel The known approach to this problem of the shortage of available codes is to introduce further downlink scrambling codes. Each downlink scrambling code provides a fresh code tree i.e. a fresh set of channelisation codes. The disadvantage of this solution is that the level of interference on the downlink (i.e. from a base station to a user terminal) is increased due to the loss of orthogonality between the code trees of the various scrambling codes.

SUMMARY OF THE INVENTION

The present invention in one aspect provides a method of allocating a channelisation code to one of a plurality of user terminals for decoding of signals sent according to a code division multiple access scheme, the plurality of user terminals being reserved the code for possible use, the method comprising selecting according to a predetermined rule the user terminal to which the code is to be allocated, and allocating the code to the selected user terminal, in which the plurality of user terminals having the code for possible use constitute a group, and there are multiple groups of terminals each having an associated code, a record is kept of which user terminals are in which group, and the user terminal to which the code is to be allocated is selected following inspection of the record to determine which user terminals are in the group associated with the code. FIG. 4 illustrates, by way of example, one method in accordance with the invention, showing steps 1-5 carried out in implementing the method.

Advantages of the present invention in its preferred embodiments are that sharing or overlapping of codes addresses the problem of channelisation code shortage. Code branches can be partially or completely shared amongst different users. Furthermore, scheduling parameters, such as subscriber priority, radio bearer priority and the dynamism of user data traffic can be taken into account.

Preferably the user terminal is selected dependent upon the respective level of priority of each user terminal. Furthermore, preferably the level of priority of a user terminal is denoted by an access class parameter.

Preferably the user terminal is selected dependent upon the amount of data buffered for transmission to the user terminals.

Preferably the user terminal is selected dependent upon the priority given to radio channels available for communication to the user terminals.

Furthermore, preferably the code is allocated to the selected user terminal by transmitting the code together with an identifier of the selected terminal.

Preferably a fresh allocation of the code among the plurality of user terminals having the code available for possible use is made for every frame.

Preferably each group has an associated code branch such that other codes in the branch than the associated code are unused. Preferably a user terminal is assigned to a group so that each group includes as few user terminals as possible. Alternatively preferably a user terminal is assigned to a group so that each group includes as many user terminals as permitted.

The present invention also relates to a corresponding a code division multiple access CDMA telecommunications network, and to a corresponding code division multiple access CDMA telecommunications base station.

The present invention in another aspect also provides a code division multiple access CDMA telecommunications network comprising a base station operative to allocate to one of a plurality of user terminals a channelisation code for decoding signals sent from the base station, the plurality of user terminals each being known to the base station as having the code for possible use, the base station comprising selection means operative to select according to a predetermined rule the user terminal which is to use the code, in which the plurality of user terminals having the code for possible use constitute a group, and there are multiple groups of terminals each having an associated unique code, a record is kept of which user terminals are in which group, and the user terminal to which the code is to be allocated is selected following inspection of the record to determine which user terminals are in the group associated with the code.

The present invention in yet another aspect also provides a code division multiple access CDMA telecommunications base station operative to allocate to one of a plurality of user terminals a channelisation code for decoding signals sent from the base station, the base station comprising a record of which user terminals have the code for possible use, the base station further comprising selection means operative to select using the record and according to a predetermined rule the user terminal which is to use the code, in which the plurality of user terminals having the code for possible use constitute a group, and there are multiple groups of terminals each having an associated unique code, a record is kept of which user terminals are in which group, and the user terminal to which the code is to be allocated is selected following inspection of the record to determine which user terminals are in the group associated with the code.

Preferably the network is a Universal Mobile Telecommunications network operating using wideband CDMA Preferably the base station comprises a radio network controller RNC operative to allocate to one of a plurality of user terminals the channelisation code, the radio network controller comprising the selection means.

BRIEF DESCRIPTION OF THE DRAWINGS

Some methods and embodiments in accordance with the present invention are described by way of example only and with reference to the drawings, in which.

DETAILED DESCRIPTION

Figure 1:
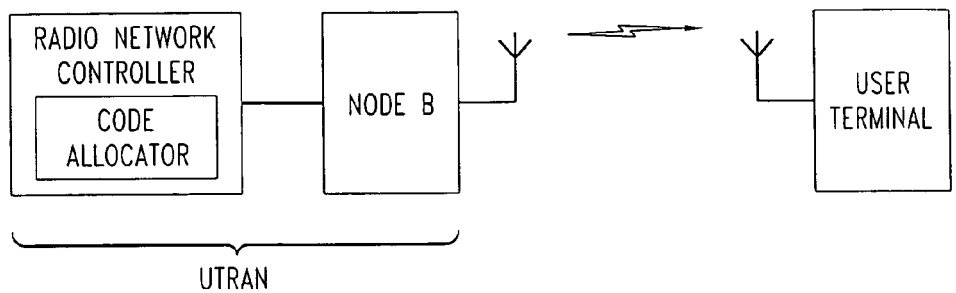
FIG. 1 is a diagram of a UMTS base station in call connection with a user terminal.
Figure 2:
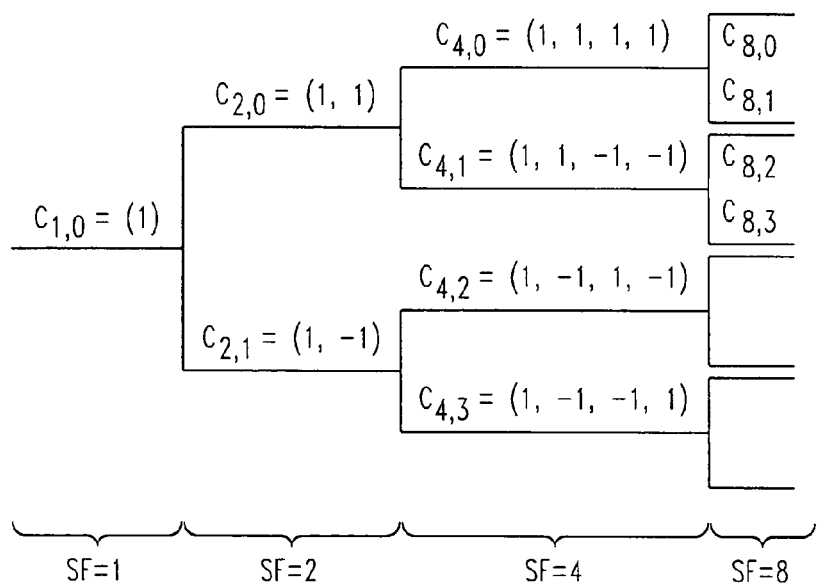
FIG. 2 is a diagrammatic illustration of a code tree.

As shown in FIG. 1, a Universal Mobile Telecommunications System UMTS terrestrial access network UTRAN is a type of base station which communicates with user terminals (user equipment UE) within its coverage area using wideband CDMA. The base station consists of an antenna system (Node B) under the control of a radio network controller RNC. For simplicity in FIG. 1 only one user terminal is shown.

Channelisation codes for use in downlink transmissions to user terminals that are in call-connection with the base station are allocated by a code allocation stage which is part of the radio network controller RNC of the base station.

A strategy of scheduling the use of codes (for downlink transmissions) amongst user terminals UEs sharing the same code branch is based on the following three parameters:

(i) Subscriber priority, as defined by Access Class (AC): The access class takes an integer value range from 0 to 10 where 0 is the highest priority user terminal UE and 10 is the lowest priority user terminal UE. The Access Class value of a user terminal UE is store in the home location register HLR of the network and is provided to the UMTS terrestrial radio access network UTRAN, specifically the base station, at call setup.

(ii) Medium access control (protocol layering) MAC Logical Priority (MLP), in other words, radio bearer priority for each radio bearer associated with a user terminal UE: The MLP takes an integer value in the range from 1 to 8, where 1 is the highest priority and 8 is the lowest priority. MAC Logical Priority (MLP is known from Third Generation Partnership Project 3GPP standards to be used for scheduling the data transmissions from different radio bearers. Use of the MLP is here extended to scheduling channelisation code among radio bearers associated with a user terminal UE. A channelisation code is given to that radio bearer with higher priority.

(iii) Buffer occupancy (either current buffer occupancy, or buffer occupancy averaged over time for each radio bearer: Buffer occupancy is a parameter known from Third Generation Partnership Project 3GPP standards to be used for scheduling data transmissions from different radio bearers. Use of buffer occupancy is here extended to scheduling channelisation code among radio bearers within a user terminal UE. The higher the buffer occupancy of a radio bearer the better the chance of being scheduled a channelisation code. If two or more radio bearers have the same MLP priority the channelisation code is assigned to that bearer with the highest buffer occupancy.

Figure 3:
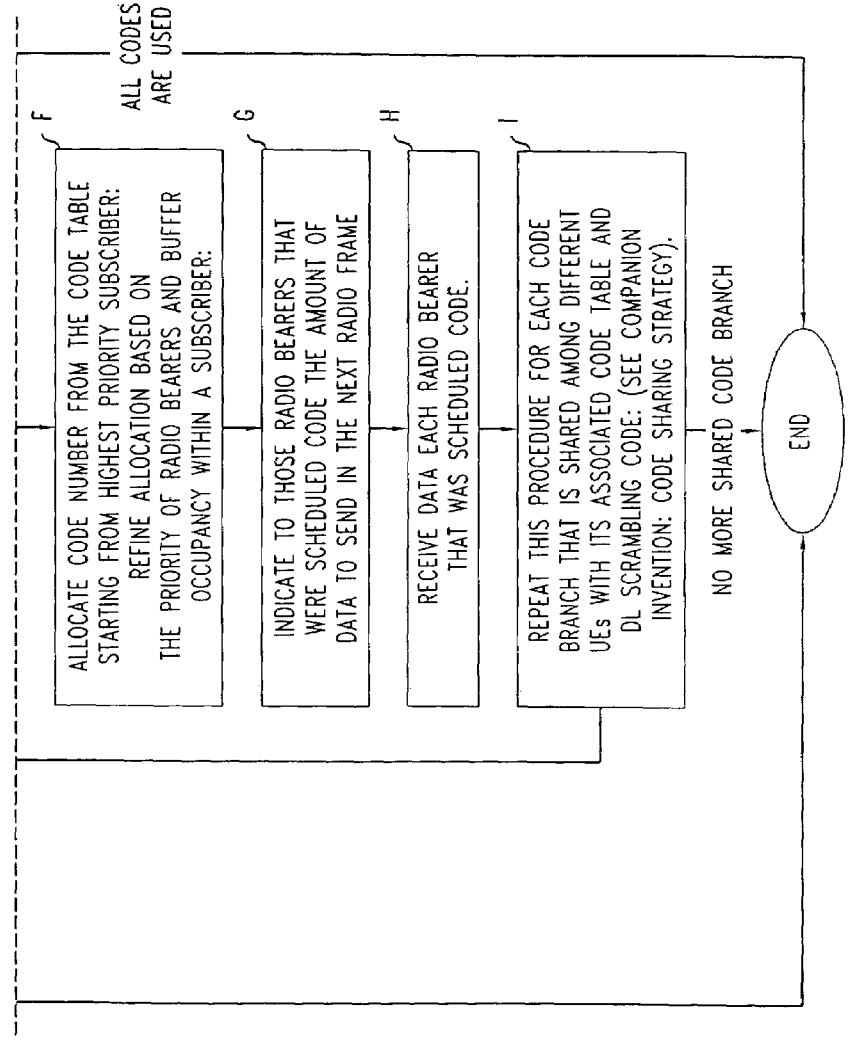
FIG. 3 is a diagrammatic illustration of the code allocation operation.
Figure 4:
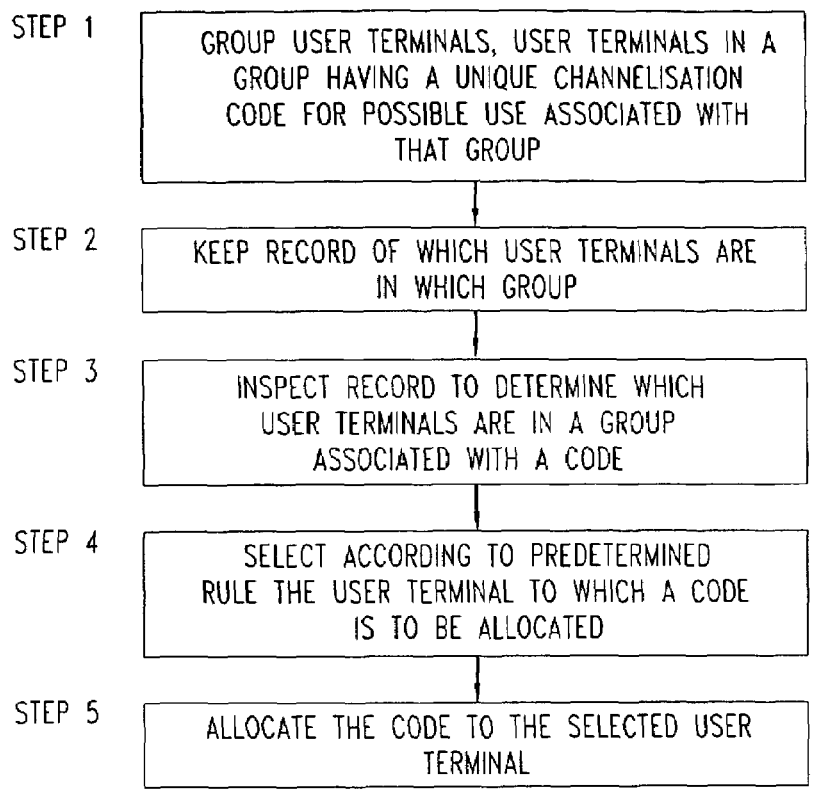
FIG. 4 illustrates steps in a method in accordance with the invention.

The sequence of events by which codes are allocated at the start of each radio frame are shown in FIG. 3. For each frame, a decision is made as to which of a group of user terminals sharing a code, the code will be used.

As shown in FIG. 3, codes which are expected to become available are noted as such and a check is made of which are already in use to a user terminal (step a). If some codes are available, a request is made for buffer occupancy information in respect of all the radio bearers (i.e. radio channels) which share a code branch (step b). If there are sufficient codes available that each radio bearer with non-zero buffer occupancy, i.e. data to transmit, can be allocated a code (step c) then this is done by inspection of the look-up table (step d).

If there are more radio bearers for which codes are desired than there are codes available, the subscriber priority (access class) and if appropriate the priority of radio bearers MLP associated to each user terminal desiring a code, are checked (step e). The code is then as allocated (step f) by inspection of the look-up table to the user terminal that has the highest subscriber priority within the group of terminals with data to send and sharing a code branch. If there is more than one terminal with the same subscriber to which data is to be sent, then that with the associated radio bearer of highest priority gets allocated the code. If there is more than one such terminal with the same subscriber priority and radio bearer priority, that with most data to receive i.e. the highest level of buffer occupancy, is allocated the code. The user terminals allocated codes are informed which radio bearers (channels) will get a code for the next radio frame (step g). The base station then sends data to the selected user terminals on each radio bearer (channel) that has been allocated code(step h).

As mentioned with regard to FIG. 3, there is a strategy of sharing codes among simultaneous users or radio bearers associated with a user. This is achieved by having code branches within a code tree assigned to multiple users which use the same downlink scrambling code. As described previously, for each frame, a selection is made of to which of the multiple users the code will be allocated. An extra value is then added to each code when sent in control signaling to the user terminals to indicate to which particular user terminal the code is allocated. The network keeps track of the use of the overlapping codes among the users by maintaining a code table (a look-up table). This look-up table allows the network to track the availability of codes (whether in use, unused or blocked) among different users within an overlapping or shared code branch.

Specifically UE_share_list is a list identifying the subscriber terminals that share the same code. An example is shown in Table 1 where users are labelled UE0, UE1, . . . UEn, where n is the maximum number of user terminals UEs that are sharing (or scheduled to share) a particular code branch. In Table 1, if UE_share_list={ }, that means that this particular code is not assigned to any user terminal. For each frame, one of the subscriber terminals, in the UE_share_list for a code can be allocated that code. For example, of the subscriber terminals which are on the UE_share_list for code $C_{16,0}$, for each frame one terminal is allocated that code. Using this method, many user terminal UEs may share a code branch or even one single code.

TABLE 1

| SF 16 | code number 0 |  |  |
|---|---|---|---|
|  | UE_share_list = {0, 1, . . .,n} |  |  |
| SF 32 | code number 0 |  | code number 1 |
|  | UE_share_list = {0,1, . . .,n} |  | UE_share_list = {0,1, . . .,n} |
| SF 64 | code no. 0 | code no. 1 | code no. 2 | code no. 3 |
|  | UE_share_ list = {0,1, . . .,n} | UE_share_ list = {0,1, . . ., n} | UE_share_ list = {0,1, . . .,n} | UE_share_ list = {0,1, . . .,n} |

As an example, let us assume that each code can be shared by up to 4 user terminals UEs. We also assume that there are 15 user terminals UEs, labelled 0,1,2, . . . ,14 sharing the codes of a particular code tree branch. As shown in the Table 2 below, code $C_{32,0}$, for example, is being shared by 4 user terminals UEs (0,1,2 and 3) and therefore has reach it full user assignment i.e. it is not available to any other user terminal. If a new user terminal UE (i.e. one that newly arrived in the coverage area of the base station) requests to share the codes which are shown in Table 2, only codes that have not reached their full user terminal UE allocation, e.g. codes $C_{16,0}$, $C_{32,1}$, $C_{64,3}$ and $C_{64,3}$ are possibilities. From Table 2, it will be seen that it is codes $C_{16,0}$ and $C_{64,3}$ that are available.

TABLE 2

| SF 16 | code no. 0 |  |  |  |
|---|---|---|---|---|
|  | UE_share_list = {} |  |  |  |
| SF 32 | code no. 0 |  | code no. 1 |  |
|  | UE_share_list = {0, 1, 2, 3} |  | UE_share_list = {4} |  |
| SF 64 | code no. 0 | code no. 1 | code no. 2 | code no. 3 |
|  | UE_share_list | UE_share_list | UE_share_list | UE_share_list |

There are two main methods that can be used to assign a code to the new user terminal UE. The first method is to 'spread' the user terminals UEs to the largest number of codes, i.e. in this example the new user terminal UE is associated to a code that is free. If all codes have at least one associated user terminal UE, then the new user terminal UE is associated to the code that has the least number of user terminal UEs in its UE_share_list, see for example code No.3 in Table 2. This is useful when relatively few user terminals are expected to be active. The second method is to preserve as many free codes as possible, i.e. fill the UE_share_list of each code before assigning a free code to a new user terminal. This is useful when many new users are expected.

In addition to these two sharing methods, it is desirable that user terminals UEs with the same priority status share the same codes in order to promote fairness. Otherwise, say where there are two user terminals UEs, one with a high priority and one with a low priority, sharing one code, the user terminal UE with a high priority will then tend to 'hog' the code, so the low priority user will rarely get a chance to use the code.

We claim:

1. A method of allocating a channelisation code to one of a plurality of user terminals for decoding of signals sent according to a code division multiple access scheme, the plurality of user terminals being reserved the code for possible use, in which the plurality of user terminal having the code for possible user constitute a group, and there are multiple groups of terminals each having an associated unique code, the method comprising the steps of:
   keeping a record of which user terminals are in which group;
   selecting according to a predetermined rule the user terminal to which the code is to be allocated, the user terminal to which the code is to be allocated being selected following inspection of the record to determine which user terminals are in the group associated with the code; and
   allocating the code to the selected user terminal.

2. A method according to claim 1, in which the user terminal is selected dependent upon the respective level of priority of each user terminal.

3. A method according to claim 1, in which the user terminal is selected dependent upon the amount of data buffered for transmission to the user terminals.

4. A method according to claim 1, in which the user terminal is selected dependent upon the priority given to radio channels available for communication to user terminals.

5. A method according to claim 1, in which a fresh allocation of the code among the group of user terminals having the code available for possible use is made for every frame.

6. A method according to claim 1, in which each group has an associated code branch such that other codes in the branch than the associated code are unused.

7. A method according to claim 1, in which a user terminal is assigned to a group so that each group includes as few user terminals as possible.

8. A method according to claim 1, in which a user terminal is assigned to a group so that each group includes as many user terminals as permitted.

9. A code division multiple access CDMA telecommunications network comprising a base station operative to allocate to one of a plurality of user terminals a channelisation code for decoding signals sent from the base station, the plurality of user terminals each being known to the base station as having the code for possible use, the base station comprising selection means operative to select according to a predetermined rule the user terminal which is to use the code, in which the plurality of user terminals having the code for possible use constitute a group, and there are multiple groups of terminals each having an associated unique code, a record is kept of which user terminals are in which group, and the user terminal to which the code is to be allocated is selected following inspection of the record to determine which user terminals are in the group associated with the code.

10. A network according to claim 9, being a Universal Mobile Telecommunications System network operating wideband CDMA.

11. A code division multiple access CDMA telecommunications base station operative to allocate to one of a plurality of user terminals a channelisation code for decoding signals sent from the base station, the base station comprising a record of which user terminals have the code for possible use, the base station further comprising selection means operative to select using the record and according to a predetermined rule the user terminal which is to use the code, in which the plurality of user terminals having the code for possible use constitute a group, and there are multiple groups of terminals each having an associated unique code, a record is kept of which user terminals are in which group, and the user terminal to which the code is to be allocated is selected following inspection of the record to determine which user terminals are in the group associated with the code.

12. A base station according to claim 11, in which the base station comprises a radio network controller RNC operative to allocate to one of a plurality of user terminals the channelisation code, the radio network controller comprising the selection means.

* * * * *